United States Patent
Chugg

(10) Patent No.: US 7,145,150 B2
(45) Date of Patent: Dec. 5, 2006

(54) RADIATION MONITOR

(75) Inventor: Andrew M Chugg, Bristol (GB)

(73) Assignee: MBDA UK Limited, Stevenage (GB)

(*) Notice: Subject to any disclaimer, the term of this patent is extended or adjusted under 35 U.S.C. 154(b) by 241 days.

(21) Appl. No.: 10/472,435

(22) PCT Filed: Mar. 19, 2002

(86) PCT No.: PCT/GB02/01292

§ 371 (c)(1),
(2), (4) Date: Sep. 23, 2003

(87) PCT Pub. No.: WO02/077668

PCT Pub. Date: Oct. 3, 2002

(65) Prior Publication Data

US 2004/0104349 A1    Jun. 3, 2004

(30) Foreign Application Priority Data

Mar. 27, 2001 (GB) ................. 0107551.4

(51) Int. Cl.
  *G01T 1/24* (2006.01)
(52) U.S. Cl. ............................................. 250/370.01
(58) Field of Classification Search .......... 250/370.01, 250/518.1
  See application file for complete search history.

(56) References Cited

U.S. PATENT DOCUMENTS

| 4,477,728 A |   | 10/1984 | Rifu |   |
|---|---|---|---|---|
| 5,204,533 A |   | 4/1993 | Simonet |   |
| 5,324,952 A | * | 6/1994 | Cummings | 250/515.1 |
| 5,557,107 A |   | 9/1996 | Carcreff et al. |   |
| 6,121,672 A | * | 9/2000 | Benedetto | 257/660 |
| 6,380,541 B1 | * | 4/2002 | Laine et al. | 250/368 |

FOREIGN PATENT DOCUMENTS

| EP | 0 211 956 A1 | 3/1987 |
|---|---|---|
| EP | 0 231 037 A1 | 8/1987 |
| FR | 2 769 717 A | 4/1999 |
| JP | 06347321 | 6/1993 |
| JP | 11153673 | 11/1997 |
| JP | 11153673 A * | 6/1999 |
| WO | 98/11410 A1 | 3/1998 |

OTHER PUBLICATIONS

Gal et al.; "Cartogam: A Portable Gamma Camera"; Nuclear Instruments & Methods in Physics Research, Section -A: Accelerators, Spectrometers, Detectors and Associated Equipment, North-Holland Publishing Company. Amsterdam, NL, vol. 387, No. 1, Mar. 1, 1997, pp. 297-303, XP004058971.

Dale, C et al; "Displacement Damage Effects in Mixed Particle Environments for Shielded Spacecraft CCD'S"; Nuclear Instruments and Method In Physics Research, , North-Holland Publishing Company. Amsterdam, NL, vol. 40, No. 6, Dec. 1993, pp. 1628-9002, XP002204085.

Buhler et al; "Radiation Environment Monitor"; Nuclear Instruments & Methods In Physics Research, Section -A: Accelerators, Spectrometers, Detectors and Associated Equipment, North-Holland Publishing Company. Amsterdam, NL, vol. A368, No. 3, Jan. 11, 1996, pp. 825-831, XP004009945.

* cited by examiner

*Primary Examiner*—Constantine Hannaher
(74) *Attorney, Agent, or Firm*—Nixon & Vanderhye P.C.

(57) ABSTRACT

A radiation monitor which utilises a CCD or a single chip camera with an active pixel array sensor as its radiation sensitive device. A shielding configuration has been utilised to mitigate the displacement damage threat in space environments, whilst also introducing a good degree of directional sensitivity.

11 Claims, 3 Drawing Sheets

RADIATION MONITOR

This application is the U.S. national phase of internation application PCT/GB02/01292 filed 19 Mar. 2002, which designated the U.S.

This invention relates to the field of radiation monitoring and more particularly, but not exclusively to the provision of such monitoring for spacecraft.

The state of the art in commercially available radiation monitors for spacecraft is exemplified by the current "compact environmental anomaly sensors" (CEASE). Such monitors are currently utilised on a wide range of space platforms to provide radiation monitoring data for use in spacecraft protection programmes. The CEASE monitor manufactured by Amptek is a typical example of a state of the art radiation centre, having a unit volume of 810 cm$^3$, a weight of 1 kg and power consumption of 1.5 watts.

In order to provide means for detecting the most threatening components of natural space radiation (i.e. those consisting of various charge particle radiations such as electrons, protons and cosmic rays), industry standard detectors employ solid state radiation dosimeters, SEU sensitive detectors and typically two element energetic particle telescopes.

There exists in principle a wide range of detector technologies which could be employed in the field of radiation monitoring, including but not limited to micro-channel multiplier tubes, discrete semiconductor devices, including RADFETS, MICRODOSE MOSFET'S (photo-) diodes, image plane array devices such as charged couple devices (CCDs) charged integrated devices (CIDs), CMOS arrays, photodiode arrays, IR sensors (HgCdTe etc.), and scintillator detectors in various geometries.

This wide range of potential detection means provides differing routes by which radiation detection and monitoring can be effected and furthermore each particular means has benefits and pitfalls which must be established in relation to the particular application that such a detector will be put to.

A particular problem existing in the field of radiation monitors relates to their use as an element of a spaceship radiation protection system. This is due to the specialist requirement for all elements of spacecraft to demonstrate minimum weight, volume and power consumption characteristics. This leads to increases in the useful payload of spacecraft and minimises the lifetime power requirements.

Semiconductor array devices such as Charged Coupled Devices CCD's have demonstrated characteristics that suggest that they could have considerable potential as radiation sensors. In particular, such devices can readily detect proton (and ion) fluxes against a significant electron flux background. CCD's also demonstrate a potentially huge dynamic range, being capable of detecting a single electron among 100,000 pixels in an integration time of several seconds, or an average of 100 electrons per pixel in an integration time of less than one millisecond. Such performance equates to over ten orders of magnitude range in dose rates, which outperforms state of the art detectors.

The application of CCD's to sensitive radiation monitoring equipment and their potential for commercial use has been an ongoing topic of research. This has led to the conclusion that a CCD could potentially form the sensitive element in a compact lightweight but highly accurate dose rate monitor, suitable for commercial exploitation as part of a spaceship radiation protection monitoring system.

Research has established that CCD's have the ability to count individual charged radiation particles and to some extent distinguish between species based on the widely varying ranges of signal deposited in a struck pixel. Proton and electron environments can therefore be measured simultaneously, but distinctly, by a single CCD array.

A technical problem inherent with the use of CCD's as a means of radiation detection is that CCD array devices cannot easily measure the energy spectrum of incident particles directly. Additionally, the direction of radiation incident on a CCD device is inherently difficult to derive.

Many existing CCD's perform adequately at total doses up to -20 krads and it is possible to harden CCD's to total doses of 1 Mrad and above. However, the very high natural levels of displacement damage experienced in most Earth orbits constitutes a major impediment to the concept of using CCD's in a space environment (see references, Proton Damage Effects on P-Channel CCD's, G R Hopkinson, IEEE Transactions on Nuclear Science, Vol. 46, No. 6, December 1999 and Displacement Damage Effects in Mixed Particle Environments for Shielded Spacecraft CCD's, Cheryl Dale et al, IEEE Transactions on Nuclear Science, Vol. 40, No. 6 December 1993).

Unless heavily shielded, a CCD will rapidly be destroyed in a spacecraft environment relative that is to the duration of most space missions. Conversely, sufficient shielding to protect against displacement damage from high energy protons would normally render the electron environment invisible to the CCD.

The most significant potential drawback with array detector devices is that most are susceptible to permanent total dose and displacement damage. This typically results in a finite lifetime for a radiation monitor in a space environment. However, this problem can be mitigated by software capable of allowing for the predictable rates of degradation, for example, areas of an array with lesser amounts of shielding would degrade faster such that the differential performance between these areas could be used to bias the compensation for radiation damage appropriately.

There are some types of array device which have been found to be relatively immune to permanent radiation damage and research is currently being directed at identifying those with optimal performance. Gordon Hopkinson in referring to CCD's (Radiation Effects on Electro-Optic Sensors, Proceedings of the Components Fit for Space Seminar, RMCS, Shrivenham, February 1998) has concluded, "Devices are starting to become available with more radiation hard oxides so that performance is possible up to 1 Mrad(Si)." However, displacement damage sensitivity (due to protons) normally remains a limiting factor for CCD's in space applications.

Individual electrons deposit a signal in a CCD pixel equal to the signal from around a thousand photons of visible light, whilst individual protons are equivalent to tens of thousands of photons. Provided the integration time of the CCD is short enough that the average signal is well below saturation, the proton and ion transits will be distinguishable from the electron background as a subset of pixels with exceptionally large signals.

Accordingly there is provided a radiation monitor comprising an outer casing, said outer casing describing a cavity, said outer casing further describing an aperture located at the apex of said cavity, the radiation monitor comprising at least one radiation sensitive device, said radiation sensitive device being located on a surface remote from said cavity aperture, the radiation monitor further comprising at least one shield, said shield being substantially disposed between the radiation sensitive device and the cavity aperture to obscure at least part of said radiation sensitive device from radiation passing through said aperture, wherein said shield is formed from a material having a high atomic number.

The shield preferably comprises at least two parts, each part having a different thickness, each part covering a different area on the surface of the radiation sensitive device.

The cavity preferably is in the form of a frustum. The cavity may be of frusto-conical or frusto-pyramidal form.

The radiation sensitive device may comprise at least one charged coupled Device (CCD). Alternatively the radiation sensitive device may comprise a single chip camera with an active pixel array sensor.

Advantageously, radiation impermeable shielding may be provided at the sides and back surface of the radiation sensitive device thereby creating an aperture of a fraction of a solid radian above the front face of the device in order to establish a directional response capability.

Preferably the aperture comprises a frusto-conical or frusto-pyramidal convergent-divergent aperture.

In further embodiment the aperture may be covered by a thin radiation-transparent window to exclude low energy radiation particles from entering the cavity.

The outer casing advantageously comprises a material having a high atomic number. The outer casing preferably comprises an outer layer of a material having a low atomic number.

The shield may be in direct physical contact with the radiation sensitive device.

Descriptions of embodiments of the invention will now be given by way of example only with reference to the accompanying drawings in which.

In order to overcome the problems of conventional radiation monitors the invention comprises the use of a heavy shielding configuration, but one which nevertheless admits a sample of the raw space radiation environment and dilutes it by a factor of ~100 across the surface of a CCD device. The particular configuration utilised by the invention which exhibits the required characteristics is that created by a pyramidal or conical convergent divergent aperture. Furthermore, by utilising this novel solution to the problem, the invention provides for a high degree of directional sensitivity in the radiation distribution across the surface of the radiation sensitive device.

In the following examples and embodiments described herein, dimensions and masses and power consumptions are described for the purposes of comparative illustration and although representative of the true invention as tested should not be considered as limiting.

Additionally the term 'shield' or 'shielding' used herein to describe the functional characteristic of high density materials having a high atomic number (Z) should be construed as representing the characteristic of allowing particles of certain energy levels the ability to pass through said materials, whilst preventing the passage of relatively lower energy particles. In this context the term 'filter' could equally be used to describe the function of said materials.

Figure 1:
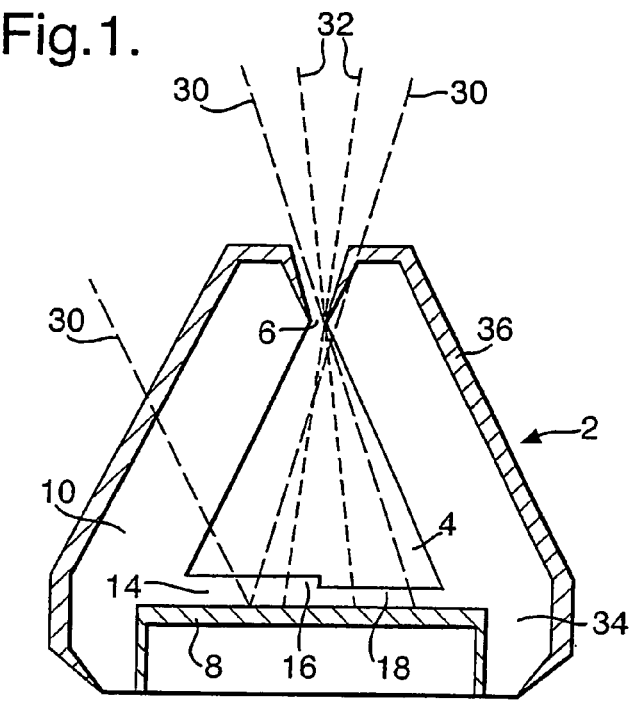
FIG. 1 shows a diagrammatic representation of a cross section of a radiation monitor in accordance with the invention illustrating electron and proton paths.
Figure 2:
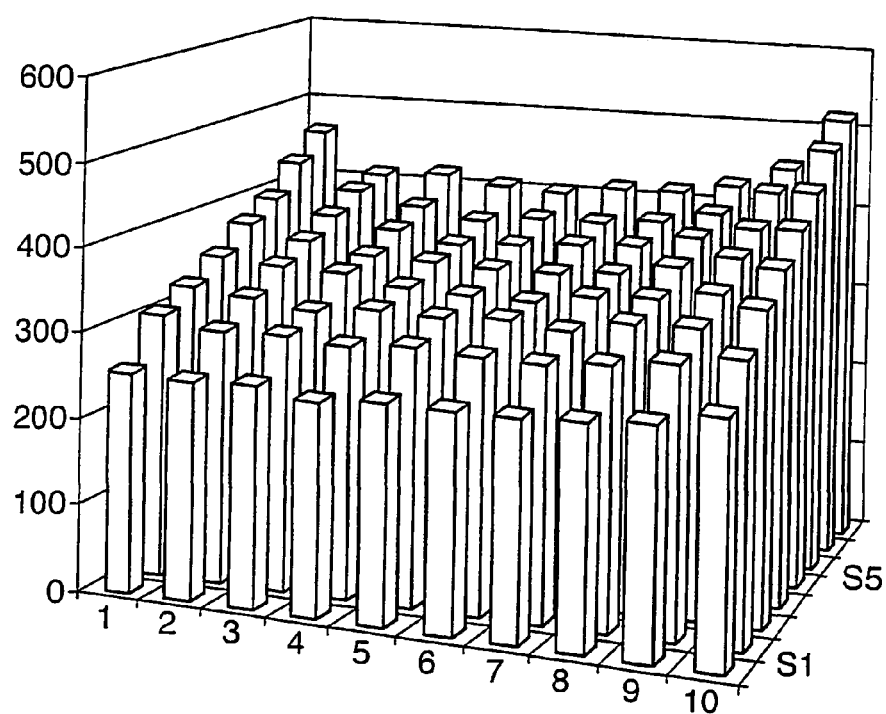
FIG. 2 shows a graph of an electron radiation field image taken from a test conducted using a standard CCD device.
Figure 3:
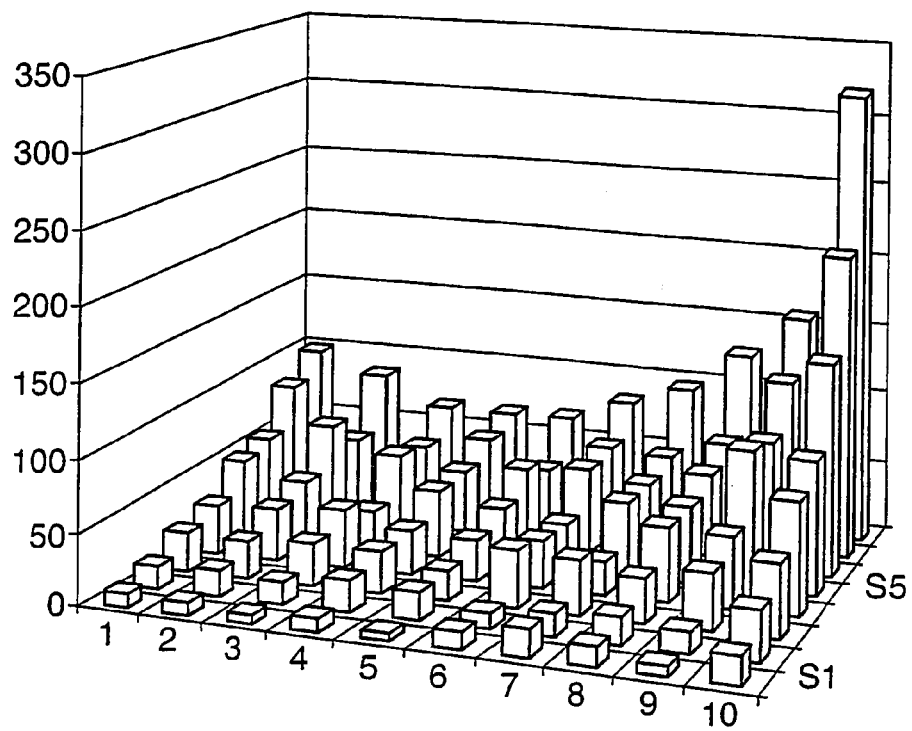
FIG. 3 shows a graph of a proton radiation field image taken from a test conducted using a standard CCD device.

FIG. 1 shows a diagrammatic representation of a radiation monitor 2 in accordance with the invention. The cavity 4 is shown of isosceles triangular cross section with a frusto-conical convergent divergent aperture 6 at the apex and a CCD 8 located on a plane opposite the aperture 6. The proton/ion tracks are represented by dotted lines 30, and the electron tracks are represented by dotted lines 32.

It has been found that narrower cavity/aperture apex angles produce significantly superior angular resolution. However, at such low apex angles the directional resolution is accentuated making the cavity unreasonably elongated and consequently too large. Conversely a squat design loses the directional resolution and fails to dilute the total proton flux sufficiently to protect the CCD from excessive displacement damage. An apex angle of approximately 60 degrees is a good compromise valve.

It would be undesirable for the monitor to be too insensitive to protons of a few tens of MeV due to such particles representing an important component of the space environment. This technical consideration is overcome by the provision of an aperture with an area in the region of 1 mm$^2$ which has the effect of causing the effective area asymptotically to converge with the area of 1 mm$^2$ as the proton energy decreases. A hole of 1 mm$^2$ is suitable because this gives approximately the required attenuation factor to keep proton flux below the displacement damage threshold for a spacecraft mission duration of some years.

Electrons and low energy protons can only enter the instrument in the close vicinity of the aperture, but higher energy protons are sufficiently penetrating as also to enter via an annulus of the aperture wall 10, the radius of which grows with increasing proton energy.

The apex angle of the cavity in one preferred embodiment of the invention as shown in FIG. 1 would therefore be substantially 60 degrees, and the cross-sectional area of the narrowest part of the aperture would be approximately 1 mm$^2$.

Above a certain threshold energy, protons will be able to penetrate the walls of the aperture cavity. It is essential that a high density (high-Z) shielding material 34 be used both to minimise the effective area of the aperture for protons at any given energy and because the mass-efficiency of the shielding is optimal for high Z-metals.

The ratio of the aperture area to the area of the CCD gives a basic attenuation factor which is augmented by a local shield 14 located over the CCD to exclude low energy particles. Such low energy particles would otherwise overwhelm the signal from the higher energy electrons of interest. Furthermore, the local shield 14 protects the CCD from direct sunlight. Ions and electrons will enter through the aperture and proceed in straight-line trajectories to impinge on the CCD. This will enable the camera literally to image the sources of these particles. Of course, in space the sources are diffuse, because the radiation is usually nearly isotropic. However, in many other applications, such as medicine, this imaging ability may be especially valuable.

The proton fluxes at the CCD will be reduced to a mission average of about 100 p cm$^{-2}$ s$^{-1}$, but it should be noted that this will still allow proton measurements to be made on timescales as short as 0.1 seconds, since most protons reaching the CCD will be detected by the device.

The radiation signal intensities among the CCD pixels will have the statistics of a compound Poisson distribution for both the proton/ion flux and the electron flux. However, the two distributions will be distinguishable, because the average signal deposited by a single proton/ion will be tens or hundreds of times greater than that from a single transient electron. However, the electron flux will normally be orders of magnitude greater than the proton/ion flux, so most CCD pixels will only see electrons in any single integration time (provided the integration time is reasonably short such that the total radiation deposited signal does not approach CCD saturation).

It is desirable that the local shield 14 be of different thicknesses 16, 18. This allows the measurement of the energy spectrum of the higher energy space electrons. With several different thicknesses of local shielding the electron dose-depth curve (and a portion of the proton dose-depth curve) may be measured. From this curve it is possible to reconstruct the electron energy spectrum.

The resulting signal distribution will be analogous to Manhattan Island in New York, where the skyscrapers would indicate proton/ion transits, but most pixels would only contain signal levels equivalent to buildings of one to several storeys indicating multiple electron transits (one per storey). The average signal intensities from the protons/ions and the electrons behind the differing thicknesses of local shielding will enable separate dose rate values at the various shielding depths for the two types of radiation to be calculated. These two or three point dose-depth curves can readily be converted to approximate energy spectra for the proton and electron fluxes.

A thin outer coating of low-Z material 36 is additionally desirable as precaution against excessive bremsstrahlung generation.

The directionality of the radiation is intrinsic in that the device acts as a pinhole camera for the radiation, where the CCD performs the function of the photographic film.

The invention provides for a radiation monitor with no moving parts and as such significantly reduces the problems associated with design and reliability problems. The ordinary rotational motions of spacecraft should normally suffice to allow a radiation monitor in accordance with the invention to survey a full range of spatial directions, provided it is secured to a suitable surface of a vehicle. If an ability to dynamically orient a monitor is required, then it is assumed that this will be provided extraneously by the spacecraft designer or could be incorporated into the design of a monitoring system.

Since in the preferred embodiment the cavity is frusto-conical and the CCD array rectangular, the corners of the CCD array will be deeply ensconced in the walls of the cavity and only very high energy protons will reach these pixels. The ratio of the proton hit rate in the corner pixels to that in the centre of the array will additionally provide a good measure of the 'hardness' of the ambient proton spectrum.

A typical array would normally comprise >1E5 pixels and the frame rate be up to 10 HZ. The data rate in these frames would therefore be at least one megabyte per second. Transmission of this amount of data to a ground station would be impractical for most missions and furthermore, there is little point in transmitting information at pixel scale resolution since the directional resolution at the array surface cannot exceed the effective area of the aperture. The monitor must therefore possess an appropriate data analysis and compression capability.

In view of the aperture area constraint on the directional resolution it is appropriate to divide the CCD array surface into blocks of pixels of area comparable to the area of the aperture (i.e. for example 10×10such elements). Each of the Radiation Image Elements (RIE's) produced by the invention comprises several thousands of CCD pixels.

There is also a requirement for radiation images for both the proton and the electron radiation fields to be generated. Since each image requires about 100 bytes, the data is reduced to around 2 kbytes per second for a 0.1 second or 10 Hz frame rate. Furthermore, occasional ion strikes should be discernible in the proton field image as RIE's with exceptional proton counts since it is known that ions produce large comet-like clusters of saturated pixels.

Figure 5:
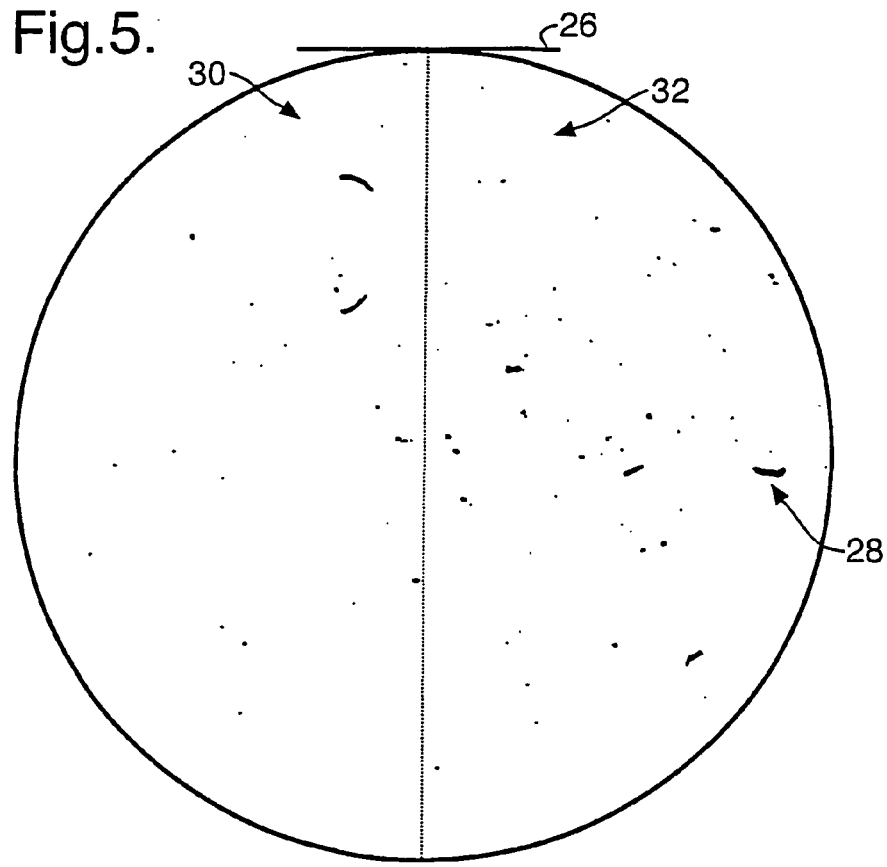
FIG. 5 shows an electron trace from a test conducted using a radiation monitor in accordance with the invention.
Figure 6:
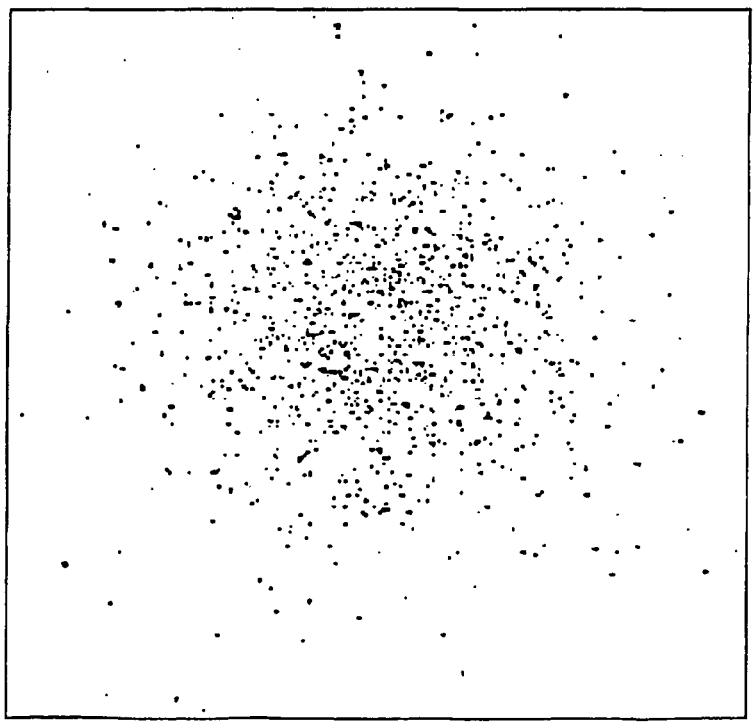
FIG. 6 shows proton spots from a test conducted using a radiation monitor in accordance with the invention.

A relatively simple algorithm was utilised for the analysis of test pixel data to generate the proton and electron RIE's shown at FIGS. 5 and 6. The assumption was made that very few pixels see proton hits that would be seen within any single integration time. Firstly the number of pixels in each RIE which record a signal level above a pre-defined Proton Counting Threshold (PCT) were counted. This count in itself provides a good measure of the proton radiation intensity and was used directly to generate the proton RIE shown at FIG. 5. The average excess signal (i.e. above the mean noise) in the remaining pixels was then used to define the electron RIE shown at FIG. 6.

There are however some important qualifications to the use of the algorithm. Firstly, the number of electron hits per pixel per integration time also is required to be <<1, else multiple electron strikes on single pixels would mimic proton hits. Secondly, the LETs (and therefore the pixel signal depositions) of high energy protons fall to levels comparable with very low energy electrons. In practice the optimum strategy will normally be to set the PCT sufficiently high as to count only lower energy protons, then to use the proton spectrum information derived from the corner RIE's to infer the relative numbers of high energy protons and thereby make allowance for them.

This algorithm has been implemented in software and validated by applying it to image frames from a Marconi Applied Technology CCD 02-06 device, irradiated using an MeV electron beam.

Figure 4:
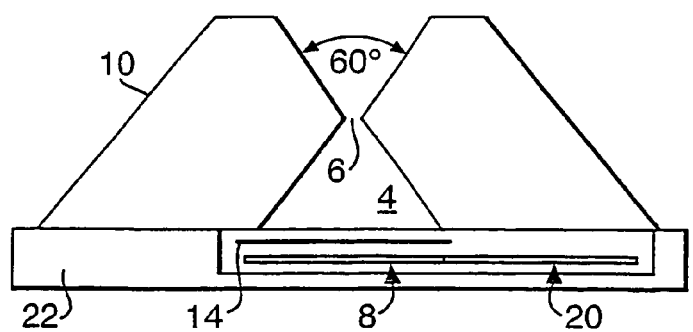
FIG. 4 shows a diagrammatic representation of a cross section of a radiation monitor in accordance with the invention, and used to produce the tests results shown at FIGS. 5 and 6.

A diagrammatic representation of a prototype CCD Radiation Monitor used in the generation of the test data referred to above is shown in FIG. 4. This prototype was designed for testing with radiation beams, point radiation sources and radioactive foils and accordingly back shielding was not required. Additionally the local shielding element described above to exclude low energy radiation particles and light from reaching the front surface of the radiation sensitive device is shown as 14. The CCD has an active area 8 and a storage area 20, and is set in a ceramic base 22.

The aperture cavity 4 was fabricated using a platinum-iridium alloy and the local shielding 14 was made of tantalum. Platinum-iridium alloy gives a very short proton range. Tungsten could also be used to fabricate the aperture cavity. The local shielding may be made of any high Z material, the high Z metals (e.g. tantalum, tungsten, gold, etc.) being particularly suitable. However selection of these materials should not be construed as limiting and the use of other materials to enhance or modify the performance of the invention are to be considered as comprised in the intended scope of the invention.

FIG. 5 shows an electron trace 26, the radiation emanating from a strontium-90-foil, and individual electron tracks 28 being visible. In this test the local shield used was tantalum, and the local shield comprised a thicker area 30 of 0.25 mm thickness and a thinner area 32 of 0.15 mm thickness. It can be seen that more electron tracks are visible where a thinner shield was used. The electron tracks where the thicker shield was used are from higher energy electrons.

FIG. 6 shows the proton spots caused by protons hitting the array during irradiation with a 60 MeV proton beam.

If required, further attenuation of the space radiation may be obtained by incorporating a radiation-transparent window across the aperture.

A radiation monitor in accordance with the invention, utilising suitable shielding configurations, will be capable of simultaneously measuring the intensities, directionalities and spectra of both the electron and proton space radiation environments with a high level of time resolution. Such a device can additionally survive the damaging effects of the space radiation environment in most orbits for normal mission durations (i.e. years).

When set in the context of a spacecraft radiation monitoring system, such a system will be required to be able to extract a desired mix of information concerning radiation type, energy spectrum and intensity from the signals from a detector. This is likely to require the use of a microprocessor, micro-controller or specialised digital signal processing device, together with some memory and other support devices. A fast analogue to digital converter may also be required in some designs. The use of a single chip camera with an Active Pixel Array sensor instead of the CCD is also feasible, since such devices are now available.

A preferred spacecraft radiation monitoring system would comprise micro-processing support to cycle the CCD array in order to perform statistical analyses of the signal distributions among the pixels and to generate spectral information from the dose-depth data points. The low physical volume, mass and power requirements of a radiation monitor in accordance with the invention therefore offers a significant technical improvement in the art for future spacecraft radiation environment monitoring.

The invention has been described for the purposes of example in the preferred embodiments in the context of spacecraft incident radiation monitoring. It will however be readily apparent to those skilled in the art that the invention can be applied to a wide range of additional applications. The possible advantages offered by the invention due to its size, weight, sensitivity, spectral and directional discrimination and modest power requirements are evident and will provide a technical advantage over existing instruments used in a wide range of radiation monitoring tasks. Many potential applications require gamma or X-ray sensitivity and a radiation monitor in accordance with the invention will additionally be sensitive to gamma and X-ray fluxes through associated secondary electron production. In particular, the use of a high Z material for the local shield gives an enhancement of the gamma or X-ray signal in the CCD. A dense cloud of low energy secondary electrons is generated by X-rays and gamma rays on passing through the high Z layer (local shield). These electrons are low energy and have very short ranges, but if the high atomic number (Z) layer is in direct contact with the CCD surface, the electrons can leak across into the CCD cells and deposit a signal. Such a process is known as the "dose enhancement effect" in the field. Consequently the high Z layer provides an alternative to a scintillator layer in detecting X-ray and gamma ray fluxes.

The following table illustrates examples of potential applications to which the invention could be applied.

| Application | Examples |
|---|---|
| Space | Environment monitoring, spacecraft dose monitoring, personnel safety, science |
| Physics | Particle accelerators |
| Geophysics | Prospecting for radionuclides (e.g. uranium ores) and for petroleum bearing sediments |
| Defence | Depleted uranium shells, fallout and radiation monitoring etc |
| Medicine | Eye cataract proton treatment, tomography etc. an array of miniature radiation monitors could replace the scintillating crystal detection used in medical gamma cameras. Better signal detection and tomographic images (instead of the current "flat" images) would be key benefits. |
| Industry | Safety in nuclear power, tritium lights, thorium coatings, radiophosphorescent paints, radiation camera for robots used in nuclear power plants |
| Environment | Nuclear power plant effluents. Radon in buildings, background radiation monitoring |

The invention claimed is:

1. A radiation monitor for detecting charged particles, said monitor comprising:
   an outer casing, said outer casing describing a cavity, said outer casing further describing an aperture located at the apex of said cavity;
   at least one charged particle detector, said charged particle detector being located on a surface remote from said cavity aperture, wherein radiation passing through said aperture directly interacts with the charged particle detector; and
   at least one shield, the shield being formed from a material having a high atomic number, said shield being substantially disposed between the charged particle detector and the cavity aperture, to obscure the charged particle detector from radiation passing through said aperture, and to thereby allow only those charged particles having a predetermined threshold energy level from reaching the charged particle detector.

2. A radiation monitor in accordance with claim 1 wherein the shield comprises at least two parts having different thicknesses.

3. A radiation monitor in accordance with claim 1 wherein the cavity has the form of a frustum.

4. A radiation monitor in accordance with claim 1, wherein said charged particle detector comprises at least one Charged Coupled Device (CCD).

5. A radiation monitor in accordance with claim 1 wherein said charged particle detector comprises a single chip camera with an active pixel array sensor.

6. A radiation monitor in accordance with claim 1 wherein said aperture comprises a frusto-conical or frusto-pyramidal convergent-divergent aperture.

7. A radiation monitor in accordance with claim 6 wherein the angles of convergence and divergence of said aperture are substantially 60 degrees from a plane perpendicular to the plane of the base of said cavity.

8. A radiation monitor in accordance with claim 1 wherein said aperture is covered by a thin radiation-transparent material to exclude low energy radiation particles from entering the cavity.

9. A radiation monitor in accordance with claim 1 wherein said outer casing comprises a material having a high atomic number.

10. A radiation monitor in accordance with claim 1 wherein said outer casing comprises an outer layer of a material having a low atomic number.

11. A radiation monitor in accordance with claim 1 wherein the shield is in direct physical contact with the charged particle detector.

* * * * *